US010683226B2

(12) United States Patent
De Angelis et al.

(10) Patent No.: US 10,683,226 B2
(45) Date of Patent: Jun. 16, 2020

(54) BELL ASSEMBLIES FOR GLASS TUBING MANUFACTURING AND GLASS TUBING MANUFACTURING APPARATUSES COMPRISING THE SAME

(71) Applicant: CORNING INCORPORATED, Corning, NY (US)

(72) Inventors: Gilbert De Angelis, Lindley, NY (US); Robert Jennings Meadows, Jr., Danville, VA (US); David Posada-Pineda, Ithaca, NY (US)

(73) Assignee: CORNING INCORPORATED, Corning, NY (US)

( * ) Notice: Subject to any disclaimer, the term of this patent is extended or adjusted under 35 U.S.C. 154(b) by 163 days.

(21) Appl. No.: 15/587,000

(22) Filed: May 4, 2017

(65) Prior Publication Data

US 2017/0320766 A1    Nov. 9, 2017

Related U.S. Application Data

(60) Provisional application No. 62/332,722, filed on May 6, 2016.

(51) Int. Cl.
*C03B 17/04*    (2006.01)
(52) U.S. Cl.
CPC .............. *C03B 17/04* (2013.01); *Y02P 40/57* (2015.11)
(58) Field of Classification Search
CPC ............................. C03B 17/025; C03B 17/04
See application file for complete search history.

(56) References Cited

U.S. PATENT DOCUMENTS

| 2,009,793 | A |   | 7/1935  | Sanchez-Vello |
|-----------|---|---|---------|---------------|
| 2,433,116 | A | * | 12/1947 | Greenbowe ............... B05B 5/12 |
|           |   |   |         | 250/488.1 |
| 2,583,431 | A | * | 1/1952  | Laidig ..................... C03B 17/04 |
|           |   |   |         | 65/184 |
| 3,078,695 | A | * | 2/1963  | Kozak ...................... C03B 7/08 |
|           |   |   |         | 373/28 |
| 3,364,004 | A | * | 1/1968  | Cozine .................... C03B 17/04 |
|           |   |   |         | 65/187 |
| 3,410,675 | A | * | 11/1968 | Dockerty ................ C03B 17/04 |
|           |   |   |         | 65/129 |
| 9,073,771 | B2 |  | 7/2015  | Goller et al. |
| 2001/0055930 | A1 | | 12/2001 | Ott et al. |
| 2007/0087194 | A1 | | 4/2007  | Singer |
| 2007/0271963 | A1 | | 11/2007 | Lange et al. |

(Continued)

FOREIGN PATENT DOCUMENTS

DE    102008009811 A1    8/2009
WO       2003018491 A1    3/2003

OTHER PUBLICATIONS

International Search Report and Written Opinion dated Aug. 31, 2017, for PCT/US2017/031085 filed May 4, 2017. pp. 1-13.

*Primary Examiner* — Queenie S Dehghan
(74) *Attorney, Agent, or Firm* — Dinsmore & Shohl LLP

(57) ABSTRACT

A bell assembly for a glass tubing manufacturing apparatus includes a bell head and a support connected to the bell head. The support includes a bell shaft with an inner bore and an outer surface, and a liner positioned in the inner bore of the bell shaft. A thermal shield extends along the outer surface of the bell shaft and reduces temperature variation across a width of the bell shaft during glass tubing manufacturing.

33 Claims, 5 Drawing Sheets

(56) References Cited

U.S. PATENT DOCUMENTS

2009/0056382 A1  3/2009  Ott et al.
2013/0186143 A1  7/2013  Ziegler et al.
2015/0232365 A1  8/2015  Bisson et al.

* cited by examiner

BELL ASSEMBLIES FOR GLASS TUBING MANUFACTURING AND GLASS TUBING MANUFACTURING APPARATUSES COMPRISING THE SAME

CROSS REFERENCE TO RELATED APPLICATIONS

The present application claims priority to U.S. Provisional Application No. 62/332,722 filed May 6, 2016, entitled, "Bell Assemblies for Glass Tubing Manufacturing and Glass Tubing Manufacturing Apparatuses Comprising the Same," the entirety of which is incorporated by reference herein.

BACKGROUND

Field

The embodiments described herein generally relate to tubing manufacturing apparatuses for forming glass tubing from molten glass and, more specifically, to bell assemblies for use with tubing manufacturing apparatuses.

Technical Background

Use of glass tubing to produce glass articles, such as vials, cartridges, and syringes, requires a high level of dimensional stability in the glass tubing wall. For example, vials, cartridges and syringes have tight dimensional requirements that require minimum concentricity and wall thickness variations. Industry standards require that wall thickness variations be less than 5% of the product's overall wall thickness. However, dimensional variations in the glass tubing from which the glass articles are formed may result in glass articles with wall thicknesses that are outside of acceptable tolerances. Such dimensional variations may be a result of, for example, processes instabilities or variations in the glass tubing manufacturing process.

Accordingly, a need exists for alternative glass tubing manufacturing apparatuses which reduce dimensional variations in the glass tubing formed therefrom.

SUMMARY

The embodiments described herein relate to bell assembly apparatuses with enhanced thermal dimensional stability that provide reduced siding loss during the production of glass tubing. Also described herein are glass tubing forming apparatuses which incorporate bell assembly apparatuses with enhanced thermal dimensional stability such that undesired movement of bells within delivery orifices of glass delivery tanks due to thermal variation across the bell assembly apparatuses during glass tubing production is reduced.

According to one embodiment, a glass tubing manufacturing apparatus includes a glass delivery tank for containing molten glass. The glass delivery tank has a delivery orifice extending through a bottom of the glass delivery tank. A bell head configured for forming molten glass into glass tubing is included and is positioned at least partially beneath the delivery orifice of the glass delivery tank. The bell head has a body with an inner channel, a bell head outer surface, and a wall made from a solid metallic material extending between the inner channel and the bell head outer surface. The wall of the bell head and the bell shaft are made from platinum or a platinum alloy. A support is connected to the bell head and the support has a bell shaft with an inner bore and an outer surface and a thermal shield positioned around at least a portion of the outer surface. The bell shaft extends from the bell head through the delivery orifice of the glass delivery tank to a bell shaft support. The thermal shield extends through the glass delivery tank but does not extend through the delivery orifice. The thermal shield includes an outer cladding and an insulation layer positioned between the outer cladding and the outer surface of the bell shaft. The bell shaft and the outer cladding of the thermal shield are made from platinum or a platinum alloy. The insulation layer of the thermal shield is made from a refractory material. The refractory material can be substantially free from organic compounds. The thermal shield can be spaced apart from the outer surface of the bell shaft, for example an air gap can be present between the outer surface of the bell shaft and the thermal shield.

According to another embodiment, a method for manufacturing glass tubing includes directing molten glass into a glass delivery tank. The glass delivery tank has a delivery orifice extending through a bottom of the glass delivery tank. The method includes drawing the molten glass around a bell head located at least partially below the delivery orifice and forming glass tubing. The bell head is connected to a support that includes a bell shaft with an inner bore and an outer surface. The bell shaft extends from the bell head through the delivery orifice and the glass delivery tank to a bell shaft support. A thermal shield extends around at least a portion of the outer surface of the bell shaft through the glass delivery tank but does not extend through the delivery orifice (i.e. the thermal shield terminates within the glass delivery tank above the delivery orifice). The thermal shield has an outer cladding with an insulation layer positioned between the outer cladding and the outer surface of the bell shaft. The thermal shield maintains an average temperature variation across a width of the bell shaft to less than 20% of an average temperature variation across a width of the outer cladding of the thermal shield.

According to another embodiment, a bell assembly for a glass tubing manufacturing apparatus includes a bell head configured for forming molten glass into glass tubing and a support connected to the bell head. The support includes a bell shaft with an inner bore and an outer surface, a liner positioned in the inner bore of the bell shaft, and a thermal shield extending along the outer surface of the bell shaft. The bell head has a body with an inner channel, a bell head outer surface, and a wall made from a solid metallic material extending between the inner channel and the bell head outer surface. The wall of the bell head can be made from platinum or a platinum alloy. The bell shaft can also be made from platinum or a platinum alloy. The liner can be made from a refractory material. In embodiments, the refractory material is substantially free from organic compounds. The thermal shield can include a cladding layer and an insulation layer positioned between the cladding layer and the outer surface of the bell shaft. The thermal shield can be spaced apart from the outer surface of the bell shaft. In embodiments, an air gap is positioned between the thermal shield and an outer surface of the bell shaft.

Additional features and advantages of the glass tubing forming apparatuses with enhanced thermal dimensional stability described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 2:
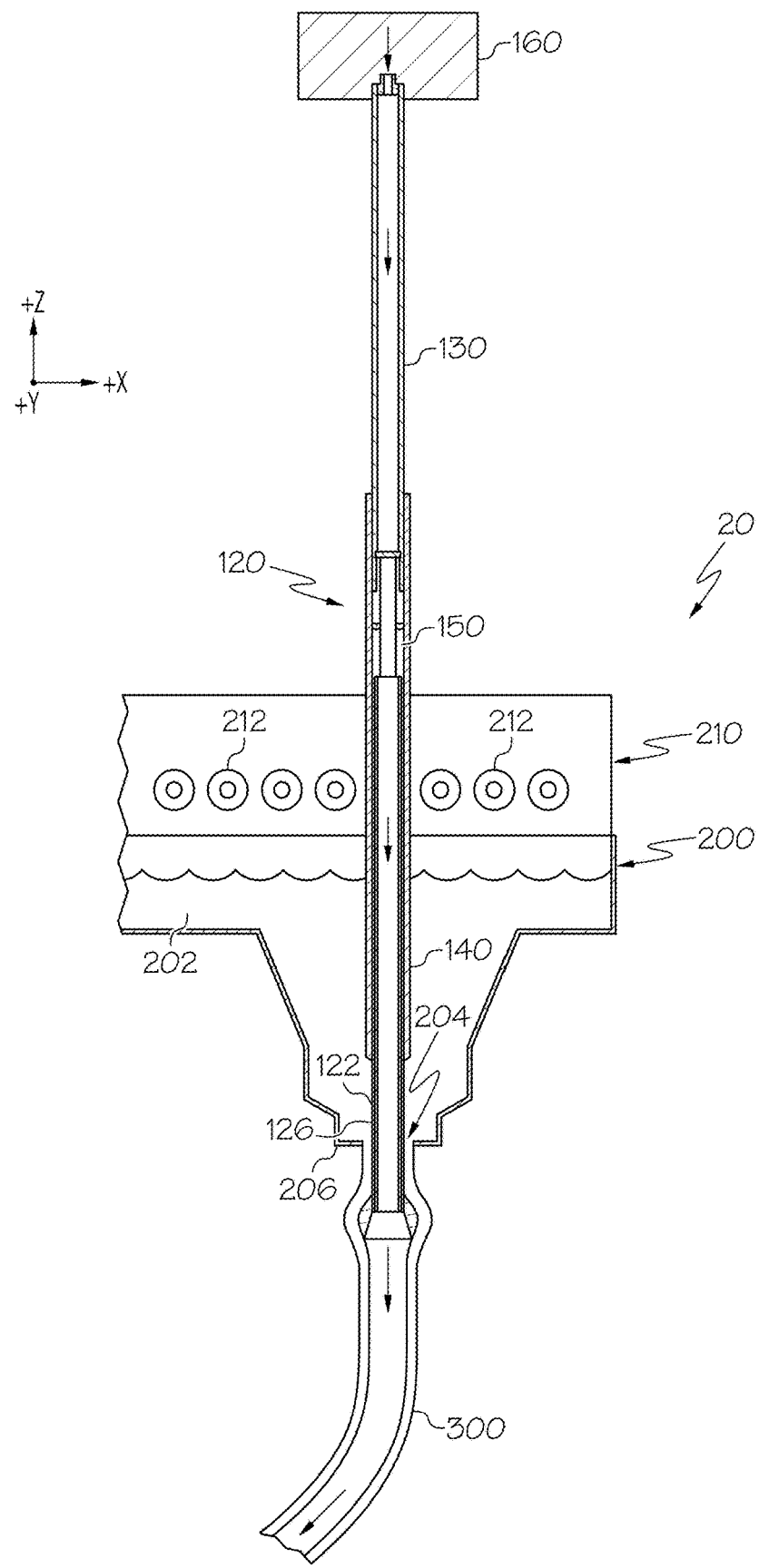
FIG. 2 is a schematic diagram of a cross section of a glass tubing manufacturing apparatus with a bell assembly according to one or more embodiments shown and described herein.

Reference will now be made in detail to various glass tubing manufacturing apparatuses and methods for forming glass tubing using the bell assemblies described herein, examples of which are illustrated in the accompanying drawings. Whenever possible, the same reference numerals will be used throughout the drawings to refer to the same or like parts. One embodiment of a glass tubing manufacturing apparatus is shown in FIG. 2. According to one embodiment, the glass tubing manufacturing apparatus may include a glass delivery tank for containing molten glass. The glass delivery tank may have a delivery orifice extending through a bottom of the glass delivery tank. The glass tubing manufacturing apparatus may also include a bell head configured for forming molten glass into glass tubing. The bell head may be positioned at least partially beneath the delivery orifice of the glass delivery tank. The bell head may be a solid bell head. That is, the bell head may have a body with an inner channel, a bell head outer surface, and a solid wall made from a metallic material extending between the inner channel and the bell head outer surface. The wall of the bell head and the bell shaft may be made from platinum or a platinum alloy. The glass tubing manufacturing apparatus may further include a support connected to the bell head. The support may have a bell shaft with an inner bore and an outer surface and a thermal shield positioned around at least a portion of the outer surface. The bell shaft extends from the bell head through the delivery orifice of the glass delivery tank to a bell shaft support. In embodiments, the thermal shield extends through the glass delivery tank but does not extend through the delivery orifice. That is, the thermal shield terminates within the glass delivery tank before reaching the delivery orifice. The thermal shield may include an outer cladding and an insulation layer positioned between the outer cladding and the outer surface of the bell shaft. The bell shaft and the outer cladding of the thermal shield may be made from platinum or a platinum alloy. The insulation layer of the thermal shield is made from a refractory material. The refractory material can be substantially free from organic compounds. The thermal shield can be spaced apart from the outer surface of the bell shaft. For example a gap, such as an air gap, can be present between the outer surface of the bell shaft and the thermal shield. Various embodiments of bell assemblies, glass tubing manufacturing apparatuses comprising bell assemblies, and methods of use thereof will be described in further detail herein with specific reference to the appended drawings.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

One process for manufacturing glass tubing is the Vello process. The Vello process may be used to form glass tubing by flowing molten glass around a bell head of a known diameter while simultaneously flowing a gas, such as air, through the bell head. The bell head is positioned and supported within an opening of a glass delivery tank containing molten glass using a bell support. The bell support is also used to supply the gas to the bell head. The bell head, in conjunction with the flowing gas, forms the molten glass into glass tubing with a desired wall thickness.

Movement of the bell head relative to the opening may be caused by thermal fluctuations in the equipment and/or mechanical perturbations. This movement may result in variations in the thickness of the wall of the glass tubing. The difference between the minimum wall thickness and maximum wall thickness on a cross section of the glass tubing is known as "siding" and variations between the minimum wall thickness and maximum wall thickness along the length of the glass tubing may be referred to as siding variations. Excessive movement of the bell head may result in glass tubing having siding variations greater than a predetermined tolerance. That is, the wall thickness of the resulting glass tubing is out of specification. Such tubing must be discarded, resulting in decreased manufacturing efficiencies and increased manufacturing costs. The amount of glass tubing removed and discarded due to the siding falling outside the siding specification limit is referred to as "siding loss."

In addition, the high temperature of the molten glass may cause degradation of the metallic material of the bell support such as, for example, scaling, oxidation, and blistering. Debris resulting from the degradation of the metallic material may be carried through the bell support and bell head by the flowing gas and into the soft glass of the resulting glass tubing. This debris may become embedded in the glass creating inclusion defects that may result in all or portions of the glass tubing being discarded, decreasing manufacturing efficiencies and increasing manufacturing costs.

Embodiments described herein provide glass tubing manufacturing apparatuses with bell assemblies which reduce siding loss in glass tubing formed therefrom. Some embodiments of the bell assemblies described herein may also mitigate inclusion defects in the glass tubing formed with the glass tubing manufacturing apparatuses.

Referring now to FIGS. 1A-1D, one embodiment of a bell assembly 10 is schematically depicted. The bell assembly 10 may be used in a glass tubing manufacturing apparatus 20 (FIG. 2) to facilitate the formation of glass tubing. The bell assembly 10 generally includes a bell head 100 and a support 120. The bell head 100 has a bell head body 102 with an inner channel 104, a bell head outer surface 106 and a bell head root 107. A bell head wall 108 extends between the inner channel 104 and the bell head outer surface 106. The bell head wall 108 is made from a solid metallic material suitable for use at the elevated temperatures experienced during glass tubing manufacturing. Suitable materials include, without limitation, platinum or platinum alloys such as 80-20 platinum-rhodium alloy and 70-30 platinum-rhodium alloy, platinum-gold alloys, platinum clad refractory metals such as platinum clad molybdenum and platinum clad refractory metal alloys such as platinum clad molybdenum alloys.

As described herein, the bell head 100 forms the molten glass into glass tubing. More specifically, molten glass flows over the bell head outer surface 106 such that the molten glass is formed into tubing as it leaves the bell head 100. Because the molten glass is in direct contact with the bell head outer surface 106, any defects or imperfections on the bell head outer surface 106 may be imparted to the inner surface of the resulting glass tubing. In the embodiments described herein, the bell head outer surface 106 may have a surface finish from about 1 to 10 micro inches Ra, for example about 2 to 4 micro inches Ra, to mitigate the formation of defects on the inner surface of the resulting glass tubing.

The bell head outer surface 106 may have a top half 106a and bottom half 106b, and the bell head root 107 may have a root diameter $D_r$. The root diameter $D_r$ may be a function of a target glass tubing inner diameter (not shown) and glass flow rate over the bell head outer surface 106. The bottom half 106b of the outer surface 106 may have a negative incline or angle (labeled θ in FIG. 1C) with respect to vertical (i.e., with respect to the Z-axis of the coordinate axes depicted in the figures. In embodiments, the negative incline angle θ is less than or equal to 21° to minimize or alleviate unstable glass flow over the bell head outer surface 106.

Still referring to FIGS. 1A-1D, the support 120 is coupled to the bell head 100 and generally includes a bell shaft 122 having an inner bore 124 and an outer surface 126. The inner bore 124 is in fluid communication with the inner channel 104 of the bell head 100 such that a pressurized fluid flowing through the inner bore 124 also flows through the inner channel 104 of the bell head 100. In the embodiments described herein, the pressurized fluid may be a pressurized gas, specifically air or an inert pressurized gas, including, without limitation, nitrogen, helium, argon, krypton, xenon, or the like. In the embodiments described herein, the bell shaft 122 can be made from metallic materials suitable for use at the elevated temperatures experienced during glass tubing manufacturing. Suitable materials include, without limitation, platinum or platinum alloys such as 80-20 platinum-rhodium alloy and 70-30 platinum-rhodium alloy, platinum-gold alloys, platinum clad refractory metals such as platinum clad molybdenum and platinum clad refractory metal alloys such as platinum clad molybdenum alloys.

Molten glass may come into contact with portions of the outer surface 126 of the bell shaft 122 as the molten glass flows towards the bell head 100. Because the molten glass is in direct contact with the outer surface 126 of the bell shaft 122, any defects or imperfections on the outer surface 126 of the bell shaft 122 may be imparted to the inner surface of the resulting glass tubing. In the embodiments described herein, the outer surface 126 of the bell shaft 122 may have a surface finish from about of from about 1 to 10 micro inches Ra, for example about 2 to 4 micro inches Ra, to mitigate the formation of defects on the inner surface of the resulting glass tubing.

Figure 3:
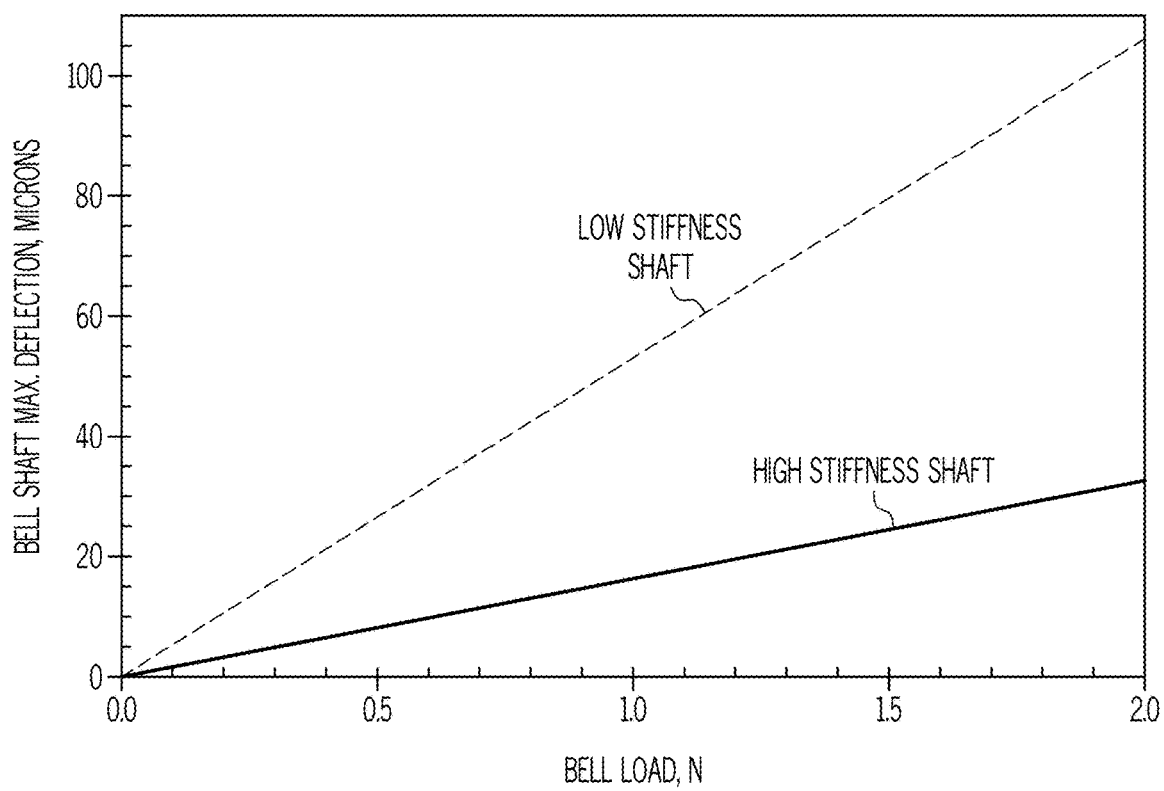
FIG. 3 graphically depicts deflection for a bell shaft with a low stiffness shaft' compared to a bell shaft with a 'high stiffness shaft'.

Deflection of the bell shaft 122 as a result of thermal fluctuations and/or mechanical perturbations may affect the glass tubing siding. Increasing the stiffness of the bell shaft 122 may reduce such deflections and, as a result, decrease siding losses. For example, FIG. 3 depicts computer modeling of the deflection (X direction) for a bell shaft with a low stiffness shaft' compared to a bell shaft with a 'high stiffness shaft' as a function of load on a bell head (X direction) coupled to each bell shaft, where the load is the force exerted on the bell head as the glass is pulled by the pulling machine (not shown) located downstream of the bell head. When subjected to the same load, the bell shaft with the higher stiffness deflects less than the bell shaft with the lower stiffness. The stiffness of the bell shaft 122 may be increased by using a bell shaft 122 with a greater wall thickness, forming the bell shaft 122 from a material with a relatively high Young's modulus, reducing the distance between the bell head 100 and a bell shaft support 160, increasing an outside diameter of the bell shaft 122, or one or more combinations of a greater bell shaft wall thickness, bell shaft material with a higher Young's modulus, reduced distance between the bell head and bell shaft support and increased outside diameter of the bell shaft. In embodiments, the wall thickness of the bell shaft may be from about 1 to about 12 millimeters, for example from about 2 to about 5 millimeters. Minimizing circularity deviations (out of round) of the bell shaft 122 may reduce the circumferential variation of glass tubing formed from molten glass that comes into contact with portions of the outer surface 126 of the bell shaft 122 as the molten glass flows towards the bell head 100 as discussed in greater detail below.

In some embodiments, the bell assembly 10 may further include a liner 128. The liner is positioned within the inner bore 124 of the bell shaft 122. In embodiments, the liner 128 is made from a refractory material. For example, the liner 128 may be made from alumina such Alumina 998 from CoorsTek. In some embodiments, the liner 128 is free from organic compounds that can volatilize and contaminate the molten glass flowing around the bell assembly 10. It should be appreciated that the liner 128 mitigates the degradation of the inner bore 124 of the bell shaft 122 and, in the event that the inner bore 124 of the bell shaft 122 does degrade such as by oxidizing, blistering, or the like, the liner 128 behaves as a barrier that prevents particulate matter resulting from the degradation of the inner bore 124 from coming into contact and being incorporated in the glass tubing drawn over the bell head 100, as discussed in greater detail below.

Figure 1A:
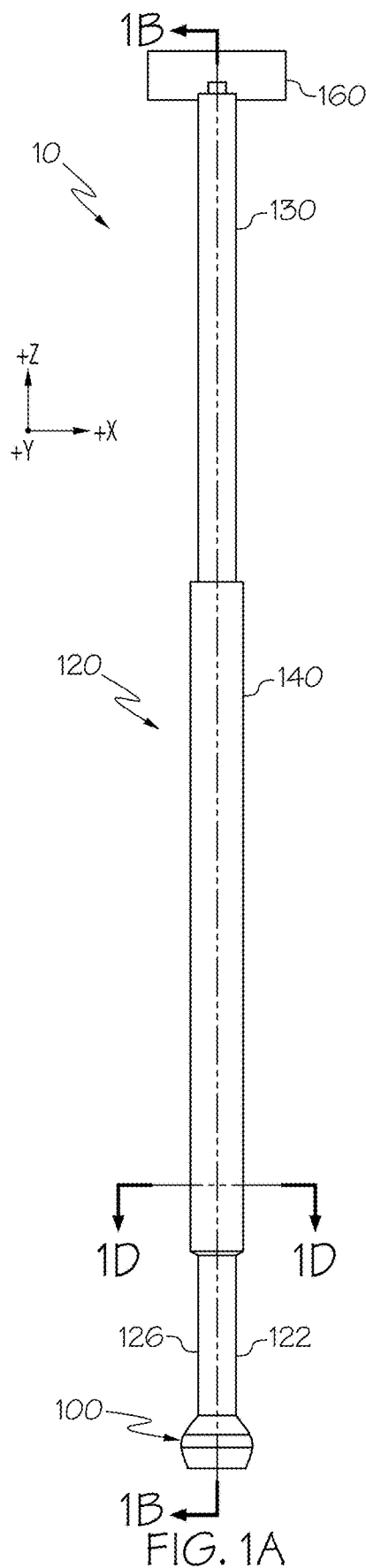
FIG. 1A is a schematic diagram of a side view of a bell assembly with a thermal shield according to one or more embodiments shown and described herein.
Figure 1B:
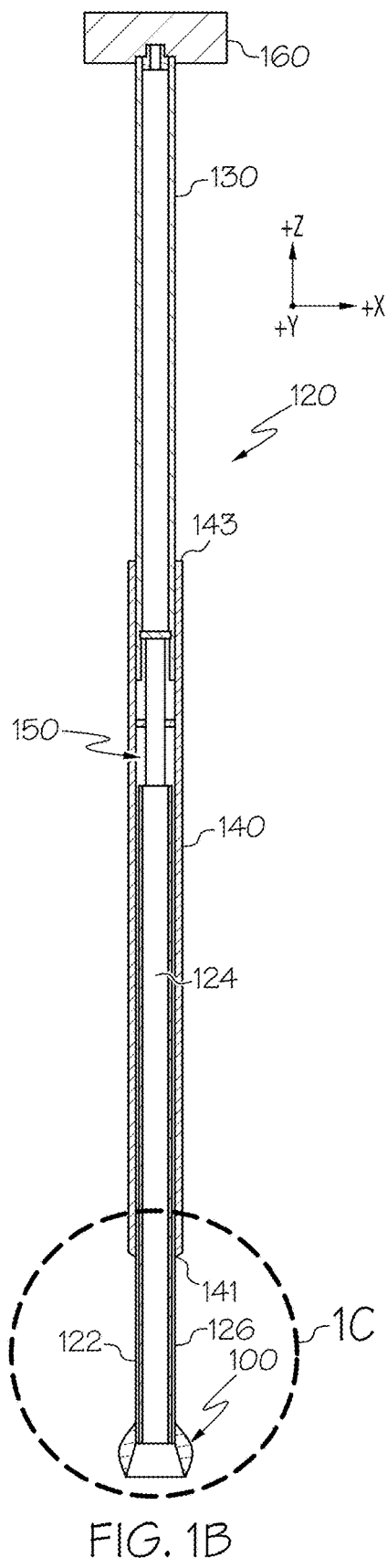
FIG. 1B is a schematic diagram of section B-B shown in FIG. 1A illustrating a cross section of a bell assembly with a thermal shield according to one or more embodiments shown and described herein.
Figures 1C, 1D:
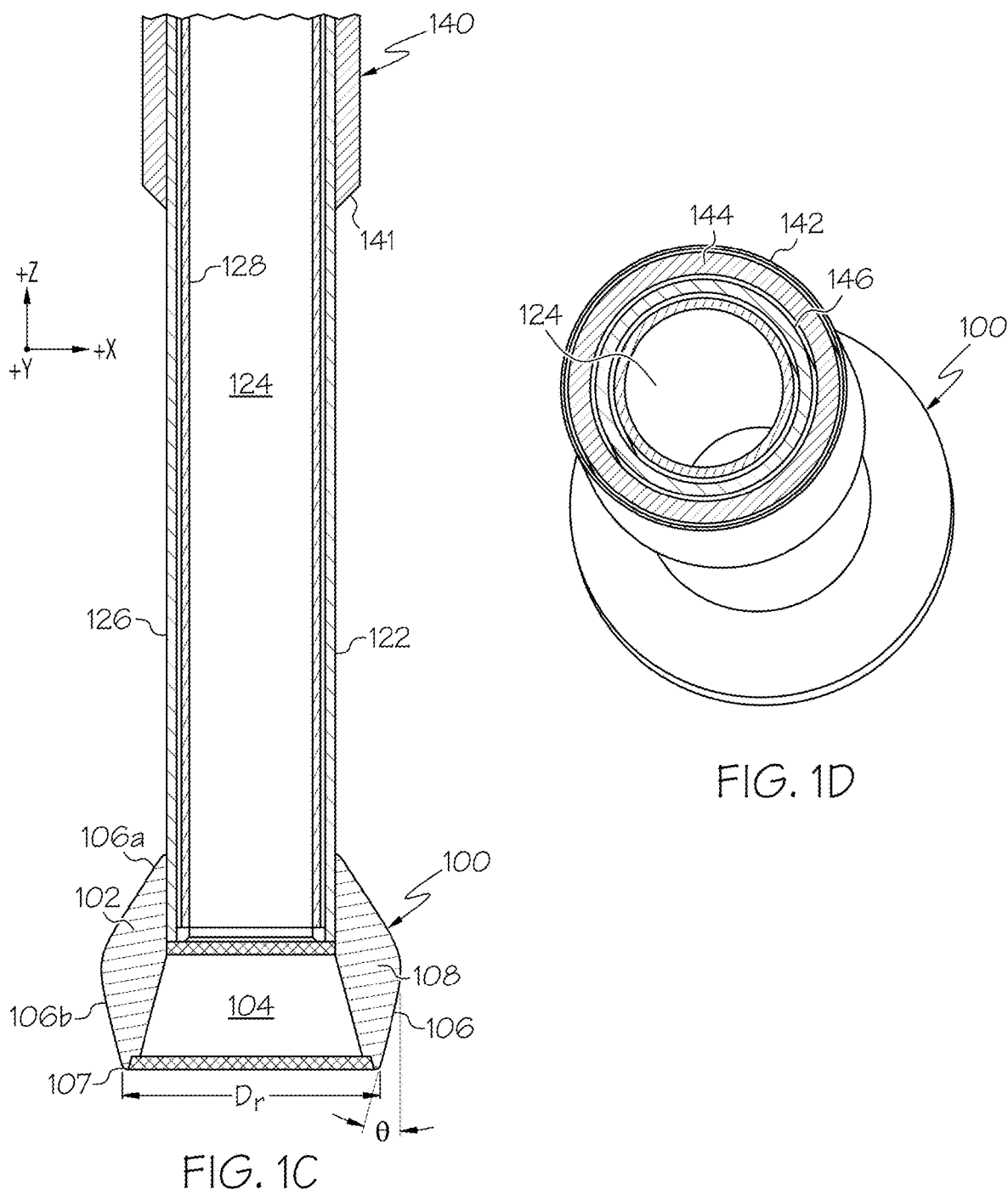
FIG. 1C is a schematic diagram of the circle region labeled '1C' shown in FIG. 1B illustrating an enlarged view of a bell head, bell shaft, and liner according to one or more embodiments shown and described herein.
FIG. 1D is a schematic diagram of section D-D shown in FIG. 1A illustrating a cross section of a thermal shield according to one or more embodiments shown and described herein.

In embodiments, the support 120 of the bell assembly 10 may further include a thermal shield 140. The thermal shield 140 extends along the outer surface 126 of the bell shaft 122 and includes a distal end 141 and a proximal end 143. In some embodiments, the distal end 141 of the thermal shield 140 terminates above the bell head 100, i.e. the distal end 141 of the thermal shield 140 is spaced apart from the bell head 100, as depicted in FIGS. 1A-1C. In some other embodiments (not depicted), the thermal shield 140 abuts the bell head 100 such that the distal end 141 of the thermal shield 140 is in contact with the bell head 100.

The thermal shield 140 may decrease or mitigate thermal perturbations by shielding or insulating the bell shaft 122 from temperature variations in the glass tubing manufacturing environment. It should be appreciated that temperature variations across the width (X direction) of the bell shaft 122 result in non-uniform expansion and contraction along the length (Z direction) of the bell shaft 122 and deflection of the bell shaft 122 and bell head 100 coupled thereto. Reducing temperature variations across the width of the bell shaft 122 decreases the deflection of the bell shaft 122 and bell head 100 coupled thereto and may result in a decrease of siding losses for glass tubing draw over the bell head 100.

In embodiments, the thermal shield 140 includes a cladding layer 142 and an insulation layer 144. The insulation layer 144 may be positioned between the cladding layer 142 and the outer surface 126 of the bell shaft 122. The cladding layer 142 can be made from metallic materials suitable for use at the elevated temperatures experienced during glass tubing manufacturing. Suitable materials include, without limitation, platinum or platinum alloys such as 80-20 platinum-rhodium alloy and 70-30 platinum-rhodium alloy, platinum-gold alloys, platinum clad refractory metals such as platinum clad molybdenum and platinum clad refractory metal alloys such as platinum clad molybdenum alloys.

Molten glass may come into contact with portions of the cladding layer 142 of the thermal shield 140 as the molten glass flows towards the bell head 100. Because the molten glass is in direct contact with the cladding layer 142 of the thermal shield 140, any defects or imperfections on the cladding layer 142 of the thermal shield 140 may be imparted to the inner surface of the resulting glass tubing. In the embodiments described herein, the cladding layer 142 of the thermal shield 140 may have a surface finish from about 10 to about 50 micro inches Ra, for example about 16 to about 32 micro inches Ra, to mitigate the formation of defects on the inner surface of the resulting glass tubing.

In embodiments, the insulation layer 144 of the thermal shield 140 can be made from a refractory ceramic material. Suitable refractory ceramic materials include, without limitation ZIRCAR refractory products Type ALC, ALC-AA, ZAL-15, ZAL-15AA, ECO-20AA, AL-30, AL-30AA, ZAL-45, AL-30AAH, AL-25/1700, SALI and SALI-2. In embodiments, the insulation layer 144 may be free from organic compounds that can volatilize and contaminate the molten glass flowing around the bell assembly 10.

In embodiments, the thermal shield 140 may be spaced apart from the outer surface 126 of the bell shaft 122 as depicted in FIG. 1D. For example, in some embodiments, a gap 146 may be disposed between the insulation layer 144 and the outer surface 126 of the bell shaft 122. In embodiments, the gap may be filled with a gas such as air and/or an inert gas such as nitrogen, helium, argon, krypton, xenon. In other embodiments, the gap 146 may be under vacuum. In general, the gap 146 provides a thermal barrier between the outer surface 126 of the bell shaft 122 and the insulation layer 144 thereby further insulating the bell shaft 122 from temperature variations across the width of the thermal shield.

Referring now to FIGS. 1A-1D and FIG. 2, one embodiment of a glass tubing manufacturing apparatus 20 comprising the bell assembly 10 of FIGS. 1A-1D is schematically depicted. Specifically, FIG. 2 depicts a side view of the glass tubing manufacturing apparatus 20 being used for the manufacture of glass tubing 300. The glass tubing manufacturing apparatus 20 includes a glass delivery tank 200 with a delivery orifice 204 extending through a bottom 206 of the glass delivery tank 200. Molten glass 202 is contained within the glass delivery tank 200. Positioned at least partially above the glass delivery tank 200 is a heater section 210 with one or more heating elements 212. The heating elements 212 can be combustion gas burners, electric heating elements, infrared heating elements, or the like. The heater section provides heat to the molten glass 202 in the glass delivery tank 200 and ensures the molten glass 202 has or maintains a desired temperature and viscosity as it flows through the delivery orifice 204 around the bell shaft 122. The bell head 100 is positioned at least partially beneath the delivery orifice 204 and the bell shaft 122 extends from the bell head 100 up through (+Z direction) the delivery orifice 204, through the molten glass 202 and the heater section 210. In embodiments, the bell head 100 is below (−Z direction) the delivery orifice 204 of the glass delivery tank 200 at a distance such that movement of the bell head 100 in the +/−Z direction does not affect the flow rate of the molten glass 202 through the delivery orifice 204 around the bell shaft 122 and over the bell head 100.

Inside the inner bore 124 of the bell shaft 122, the liner 128 extends from the bell head 100 up through the delivery orifice 204, the molten glass 202, and the heater section 210. The thermal shield 140 extends along the outer surface 126 of the bell shaft 122 through the heater section 210 and through at least part of the glass delivery tank 200 within the molten glass 202. In the embodiment depicted in FIG. 2, the thermal shield 140 terminates within the glass delivery tank 200 and is spaced apart from the delivery orifice 204.

However, in alternative embodiments (not shown), the thermal shield extends to and contacts the bell head, as described herein. In embodiments, the support 120 can include a coupler 150 that couples the bell shaft 122 to a bell shaft extension 130. It should be appreciated that the greatest temperatures in the glass manufacturing apparatus 20 occur in the heater section 210, followed by the temperatures in the glass delivery tank 200 and then the temperatures in the region above (+Z direction) the glass delivery tank. Accordingly, the portion of the bell shaft 122, which is located within the heater section 210 and glass delivery tank 200 may be made from materials suitable for use at elevated temperatures, such as platinum or platinum alloys, whereas the bell shaft extension 130, which extends from the coupler 150 to the bell shaft support 160 and is located within the region above the heater section 210, may be made from materials suitable for lower temperature applications, such as Inconel 600 or 310 stainless steel, which are less expensive and less temperature resistant (compared to platinum or platinum alloys). In operation, molten glass 202 is delivered to the glass delivery tank 200. In embodiments, the temperature of the molten glass within the glass delivery tank 200 is maintained with the heater section 210. The bell assembly 10 is positioned with the bell shaft support 160 such that the bell head 100 is positioned at least partially below (−Z direction) the delivery orifice 204 of the glass delivery tank 200. Molten glass 202 flows through the delivery orifice 204, around the bell shaft 122 and over the bell head 100 which shapes the molten glass 202 into glass tubing 300. Minimizing circularity deviations of the bell shaft 122 as described above, particularly in the section of bell shaft 122 that passes through the delivery orifice 204, reduces circumferential variation of glass tubing 300 formed from the molten glass 202 that comes into contact with portions of the outer surface 126 of the bell shaft 122 as the molten glass 202 flows through delivery orifice around the bell shaft 122 and towards the bell head 100.

As the molten glass flows over the bell head 100, a pressurized fluid, such as air, is directed through the inner bore 124 of the bell shaft 122 and through the inner channel 104 of the bell head 100 and into the interior of the glass tubing 300. The pressurized gas supports the interior of the glass tubing 300 after it flows from the bell head 100 and is no longer in contact with the bell head outer surface 106, as schematically depicted in FIG. 2.

The thermal shield 140 decreases or mitigates thermal perturbations to the bell shaft 122 by insulating the bell shaft 122 from temperature variations within the glass tubing manufacturing apparatus 20. Specifically, the highest temperatures and greatest temperature variations occur within the heater section 210. The temperature variations in the heater section 210 result in thermal gradients across the diameter of the bell shaft 122. However, the thermal shield 140 insulates the bell shaft 122 and thereby reduces temperature variations across the diameter of the bell shaft 122. Reducing temperature variations across the width of the bell shaft 122 decreases the deflection of the bell shaft 122 and the bell head 100 coupled thereto thereby reducing siding losses for glass tubing 300 produced with the glass tubing manufacturing apparatus 20.

Deflection of the bell shaft 122 can also be reduced by increasing the stiffness of the bell shaft (FIG. 3), for example by increasing the wall thickness of the bell shaft 122, using a bell shaft material with a higher Young's modulus, decreasing the distance between the bell head 100 and the bell shaft support 160, increasing an outside diameter of the bell shaft 122, or any combination thereof.

As noted hereinabove, the liner 128 mitigates the degradation of the inner bore 124 of the bell shaft 122, such as by oxidizing, blistering, or the like, thereby mitigating inclusion defects in the glass. In the event that the inner bore 124 of the bell shaft 122 does degrade, the liner 128 behaves as a barrier that prevents particulate matter resulting from the degradation of the inner bore 124 from coming into contact and being incorporated in the glass tubing drawn over the bell head 100.

In embodiments, the distal end 141 of the thermal shield 140 terminates within the glass delivery tank 200 at a position above and spaced apart from the delivery orifice 204, i.e. the thermal shield does not extend through the delivery orifice 204. It should be appreciated that with the bell shaft 122 extending through the delivery orifice 204, without the presence of the thermal shield 140, tighter tolerance of the glass tubing wall thickness is maintained. It should also be appreciated that the highest temperatures and greatest temperature variations within the glass tubing manufacturing apparatus 20 can be within the heater section 210. The thermal shield 140 insulates the bell shaft 122 from such temperature variations.

Figure 4:
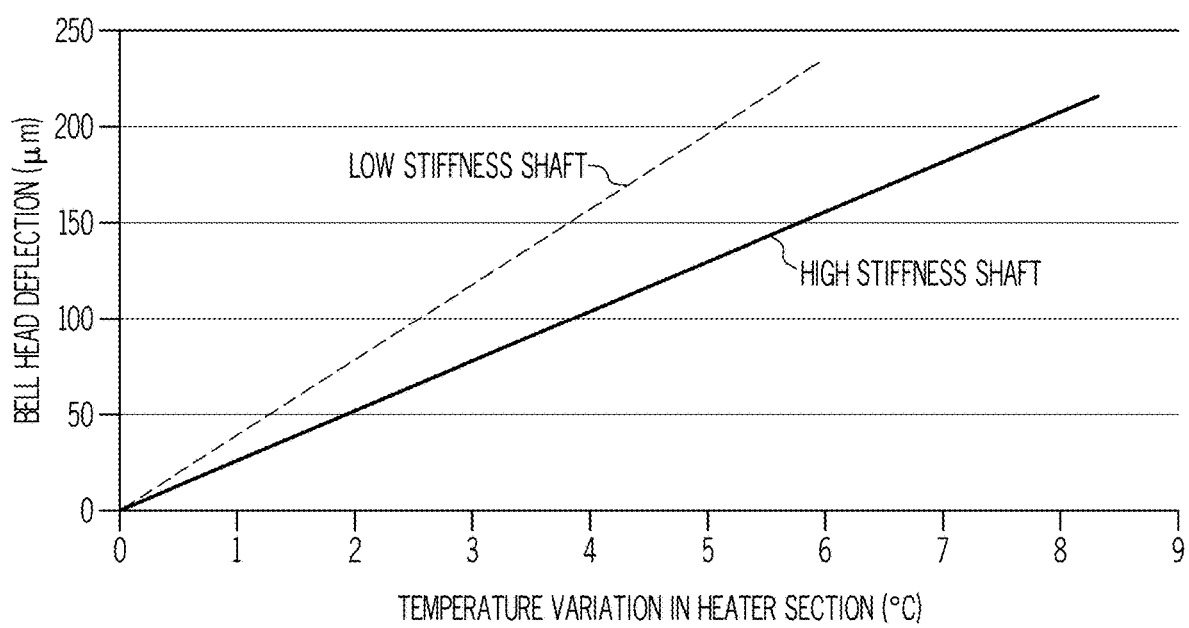
FIG. 4 graphically depicts deflection of a bell head as function of temperature variation and bell shaft stiffness.

Referring now to FIG. 4, computer modeling results for the deflection of two bell heads 100 as function of temperature variation in a heater section 210 and stiffness of two bell shafts 122 is depicted. The deflection of the two bell heads 100 is the result of temperature variation across a width of a respective bell shaft 122 coupled to a given bell head 100. The deflection of the two bell heads 100 is modeled for a section of bell shaft 122 located within the heater section 210 about 0.6 meters from the bell head 100. As shown in FIG. 4, the bell head 100 coupled to the bell shaft 122 with the "high stiffness shaft" exhibits an approximate 30% reduction in deflection compared to the bell head 100 coupled to the bell shaft 122 with the "low stiffness shaft." The "high stiffness shaft" had a larger outside diameter and a greater wall thickness than the "low stiffness shaft." As noted herein, decreased deflection of the bell shaft reduces siding losses and, as a result, improves production efficiencies and throughput.

Figure 5A:
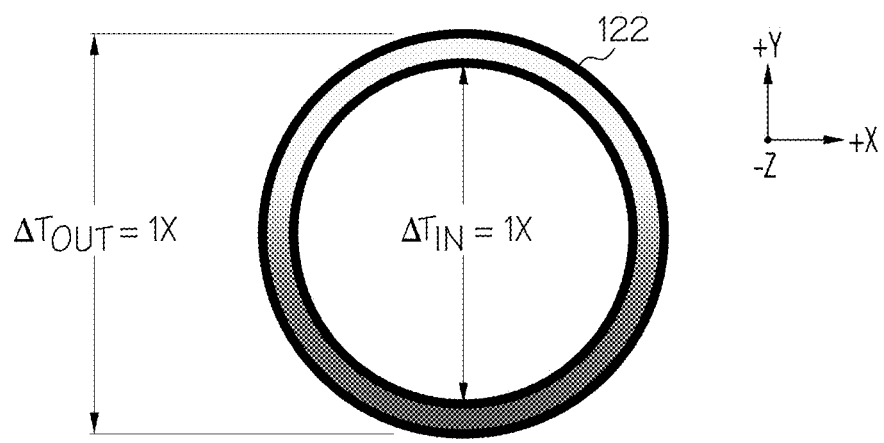
FIG. 5A is a schematic diagram of a temperature variation (ΔT) cross section of a bell shaft without a thermal shield.
Figure 5B:
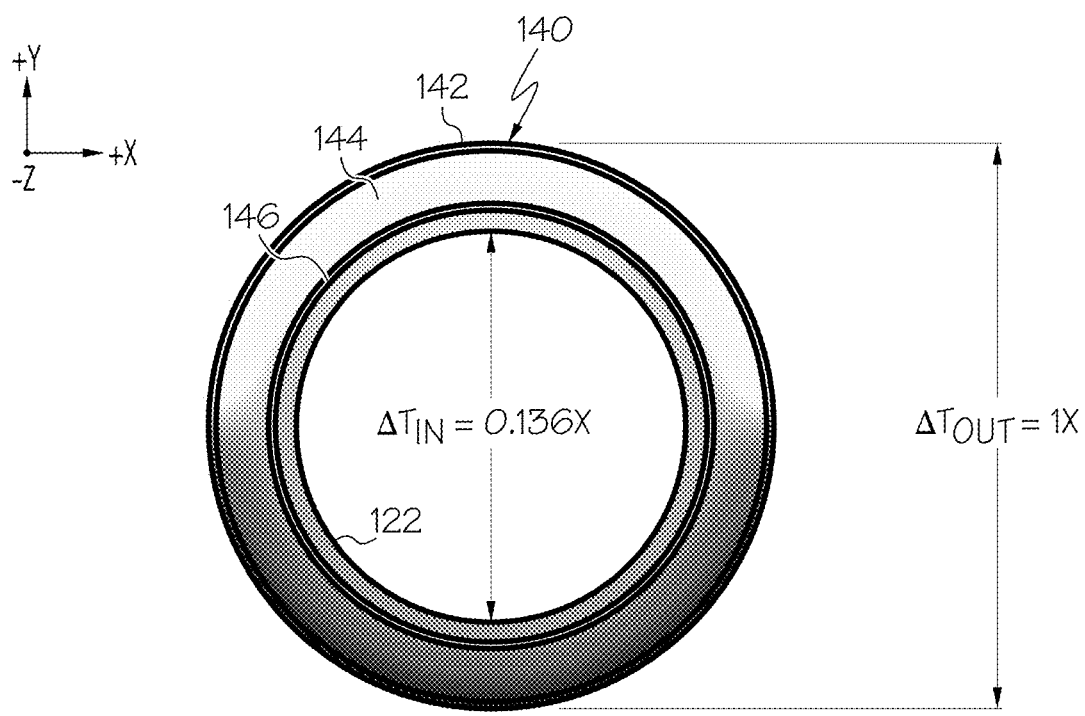
FIG. 5B is a schematic diagram of a temperature variation (ΔT) cross section of a bell shaft with a thermal shield according to one or more embodiments shown and described herein.

Referring to FIGS. 5A-5B, computer modeling results for the temperature variation across a width (+Y direction) of the bell shaft 122 with and without the presence of the thermal shield 140 is depicted. Particularly, FIG. 5A illustrates the temperature variation across the width of the bell shaft 122 without the presence of the thermal shield 140 and FIG. 5B illustrates the temperature variation across the width of the bell shaft 122 with the presence of the thermal shield 140. The bell shaft 122 had a wall thickness of 3 millimeters. As shown in FIG. 5B, the temperature variation across the width of the bell shaft 122 is reduced from 1× when no thermal shield 140 is present to 0.136× when the thermal shield 140 is present. That is, the thermal shield 140 reduces temperature variations across the bell shaft 122 by at least 20%. In embodiments, the reduction in temperature variation across the width of the bell shaft 122 is greater than 40%, preferably greater than 50%, and more preferably greater than 60%. It should be appreciated that the reduction in temperature variation results in increased dimensional stability of the bell head 100 during glass tubing manufacturing and reduced siding loss.

It will be apparent to those skilled in the art that various modifications and variations can be made to the embodiments described herein without departing from the spirit and scope. Thus it is intended that the embodiments described herein cover any modifications and variations provided they come within the scope of the appended claims and their equivalents.

What is claimed is:

1. A glass tubing manufacturing apparatus comprising:
a glass delivery tank for containing molten glass, the glass delivery tank comprising a delivery orifice extending through a bottom of the glass delivery tank;
a bell head configured for forming molten glass into glass tubing, the bell head positioned at least partially beneath the delivery orifice of the glass delivery tank;
a support connected to the bell head, the support comprising:
a bell shaft with an inner bore and an outer surface, the bell shaft extending from the bell head through the delivery orifice of the glass delivery tank to a bell shaft support;
a thermal shield positioned around at least a portion of the outer surface of the bell shaft, the thermal shield extending through the glass delivery tank, the thermal shield comprising:
an outer cladding; and
an insulation layer positioned between the outer cladding and the outer surface of the bell shaft; and
a gap positioned between the outer surface of the bell shaft and the thermal shield, the gap extending the length of the thermal shield, wherein the gap is disposed directly between the insulation layer and the outer surface of the bell shaft, wherein the thermal shield ends at a position on the bell shaft that is spaced apart from the bell head.

2. The glass tubing manufacturing apparatus of claim 1, wherein the bell head comprises a body with an inner channel, a bell head outer surface and a wall made from a solid metallic material extending between the inner channel and the bell head outer surface.

3. The glass tubing manufacturing apparatus of claim 2, wherein the wall of the bell head and the bell shaft are made from platinum or a platinum alloy.

4. The glass tubing manufacturing apparatus of claim 1, wherein the bell shaft extends from the bell head up through the glass delivery tank.

5. The glass tubing manufacturing apparatus of claim 1, further comprising a liner positioned in the inner bore of the bell shaft.

6. The glass tubing manufacturing apparatus of claim 5, wherein the liner is made from a refractory material.

7. The glass tubing manufacturing apparatus of claim 6, wherein the refractory material is substantially free from organic compounds.

8. The glass tubing manufacturing apparatus of claim 7, wherein the liner is made from alumina.

9. The glass tubing manufacturing apparatus of claim 5, wherein a pressurized fluid is directed through the inner bore of the bell shaft, wherein the pressurized fluid contacts the liner.

10. The glass tubing manufacturing apparatus of claim 1, wherein the outer cladding is made from platinum or a platinum alloy.

11. The glass tubing manufacturing apparatus of claim 1, wherein the insulation layer is made from a refractory material.

12. The glass tubing manufacturing apparatus of claim 11, wherein the refractory material is substantially free from organic compounds.

13. The glass tubing manufacturing apparatus of claim 1, further comprising a heater section located above the glass delivery tank, the heater section configured to heat the molten glass in the glass delivery tank.

14. The glass tubing manufacturing apparatus of claim 13, wherein the thermal shield extends through the heater section.

15. A method for manufacturing glass tubing comprising:
directing molten glass into a glass delivery tank, the glass delivery tank comprising a delivery orifice extending through a bottom of the glass delivery tank;
drawing the molten glass around a bell head located at least partially below the delivery orifice of the glass delivery tank thereby forming glass tubing, the bell head connected to a support comprising:
a bell shaft with an inner bore and an outer surface, the bell shaft extending from the bell head through the delivery orifice of the glass delivery tank to a bell shaft support; and
a thermal shield positioned around at least a portion of the outer surface of the bell shaft, the thermal shield extending through the glass delivery tank, the thermal shield comprising:
an outer cladding;
an insulation layer positioned between the outer cladding and the outer surface of the bell shaft; and
a gap positioned between the outer surface of the bell shaft and the thermal shield, the gap extending the length of the thermal shield, wherein the gap is disposed directly between the insulation layer and the outer surface of the bell shaft, wherein the thermal shield ends at a position on the bell shaft that is spaced apart from the bell head.

16. The method of claim 15 wherein the thermal shield terminates within the glass delivery tank above the delivery orifice.

17. The method of claim 15, further comprising heating the molten glass with a heater section located at least partially above the glass delivery tank, wherein the thermal shield extending through the heater section.

18. The method of claim 17, further comprising the thermal shield maintaining an average temperature variation across a width of the bell shaft within the heater section to less than 20% of an average temperature variation across a width of the outer cladding of the thermal shield.

19. The method of claim 15, further comprising a liner positioned within the inner bore of the bell shaft, the liner extending from the bell head up through the glass delivery tank.

20. The method of claim 19, wherein the liner is made from a refractory material.

21. The method of claim 20, wherein the refractory material is substantially free from organic compounds.

22. The method of claim 21, wherein the liner is made from alumina.

23. The method of claim 19, further comprising the liner mitigating degradation of the inner bore of the bell shaft.

24. The method of claim 19, wherein the liner is a barrier to particulate matter resulting from mitigation of the inner bore of the bell shaft from coming into contact and being incorporated in the glass tubing drawn over the bell head.

25. A bell assembly for a glass tubing manufacturing apparatus comprising:
a bell head configured for forming molten glass into glass tubing;

a support connected to the bell head, the support comprising:
  a bell shaft comprising an inner bore and an outer surface;
  a liner positioned in the inner bore of the bell shaft;
  a thermal shield extending along the outer surface of the bell shaft, the thermal shield comprising:
    a cladding layer; and
    an insulation layer positioned between the cladding layer and the outer surface of the bell shaft; and
  a gap positioned between the outer surface of the bell shaft and the thermal shield, the gap extending the length of the thermal shield, wherein the gap is disposed directly between the insulation layer and the outer surface of the bell shaft, wherein the thermal shield ends at a position on the bell shaft that is spaced apart from the bell head.

26. The bell assembly of claim 25, wherein the bell head comprises a body with an inner channel, a bell head outer surface and a wall made from a solid metallic material extending between the inner channel and the bell head outer surface.

27. The bell assembly of claim 26, wherein the wall of the bell head is made from platinum or a platinum alloy.

28. The bell assembly of claim 25, wherein the liner is made from a refractory material.

29. The bell assembly of claim 25, wherein the bell shaft is made from platinum or a platinum alloy.

30. The bell assembly of claim 28, wherein the refractory material is substantially free from organic compounds.

31. The bell assembly of claim 25, wherein the liner is made from alumina.

32. The bell assembly of claim 25, wherein the cladding layer is made from platinum or a platinum alloy.

33. The bell assembly of claim 25, wherein the insulation layer is made from a refractory material.

* * * * *